Figure 1:
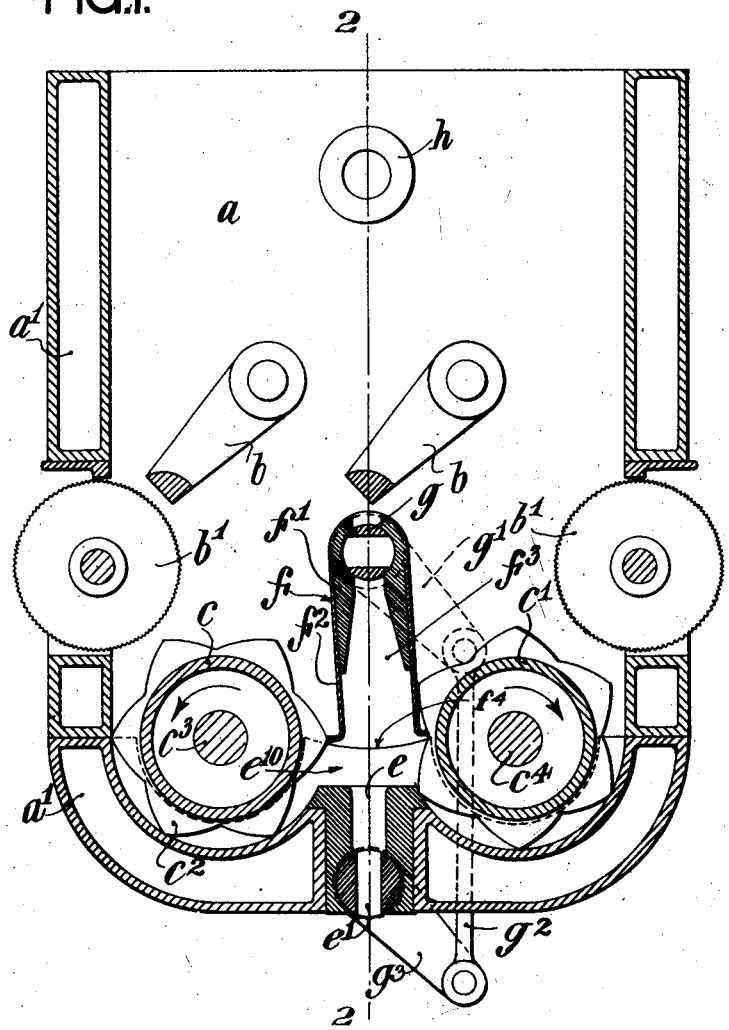

April 16, 1929.　　　J. P. BUNCE　　　1,709,519
APPARATUS FOR MEASURING AND DEPOSITING PLASTIC SUBSTANCES
Filed June 15, 1928　　2 Sheets-Sheet 1

Inventor:
John Percival Bunce
Deceased, By,
Gwendoline Denning Bunce
Admx.
by her Attorney:

April 16, 1929. J. P. BUNCE 1,709,519
APPARATUS FOR MEASURING AND DEPOSITING PLASTIC SUBSTANCES
Filed June 15, 1928  2 Sheets-Sheet 2

Inventor:
John Percival Bunce, deceased
Gwendoline Denning Bunce,
Administratrix.

Patented Apr. 16, 1929.

1,709,519

UNITED STATES PATENT OFFICE.

JOHN PERCIVAL BUNCE, DECEASED, BY GWENDOLINE DENNING BUNCE, ADMINISTRATRIX, OF GREENFORD, ENGLAND, ASSIGNOR TO BAKER PERKINS CO. INC., OF SAGINAW, MICHIGAN, A CORPORATION OF NEW YORK.

APPARATUS FOR MEASURING AND DEPOSITING PLASTIC SUBSTANCES.

Application filed June 15, 1928, Serial No. 285,670, and in Great Britain June 28, 1927.

This invention relates to apparatus for measuring and depositing plastic substances such as chocolate, particularly for the purpose of delivering the same into moulds, although not limited to such purpose, and in which there is used a receptacle for the material together with measuring and feeding rollers for discharging the material therefrom and means for varying the angular movement given to said rollers so as to vary the quantities of material discharged.

The rollers are provided on their peripheries with, or so formed as to produce, peripheral teeth, undulations, corrugations or the like which, if the axes of the rollers were placed sufficiently close together, would more or less engage or intermesh and, in conjunction with a portion of the receptacle, with the inner wall of which certain of said teeth or undulations contact, would form an approximately sealed measuring chamber into which the material is conducted by the rotation of the rollers and forced therefrom through a discharge opening in the receptacle.

The present invention consists in placing the axes of the measuring and feeding rollers at a sufficient distance apart for the interposition between the peripheries of the rollers of an oscillatory closure which has a passage way into the remainder of the vessel, this passage way being closable by a relief valve. The extrusion orifice of the depositing chamber is also provided with a valve. These two valves may be operated by means, preferably external to the chamber, so that when either valve is closed the other is opened. In an alternative form the first mentioned valve may be an automatic relief valve for the depositing chamber, as for example a spring operated valve, and the second mentioned valve may be mechanically operated. By this construction it is unnecessary to provide for intermittence in the revolution of the measuring and feeding rollers, and if desired also it is possible to avoid the necessity for varying the speed of revolution of the rollers, since either or both of these results may be attained by suitably timed and regulated operation of the valves aforesaid or of only the extrusion valve if the relief valve is of the automatic type. Any excess of material fed by the measuring and feeding rollers into the depositing chamber over that which is to be extruded during any given period of time will pass back into the body of the vessel through the relief valve. If a mechanically operated relief valve is used it is preferably placed at the pivotal centre of the oscillatory closure.

The provision of a closure such as described permits of dealing with plastic substances such as chocolate which contain lumps such as nuts or fruits which would otherwise become broken or damaged by inter-engagement of the undulations or teeth of the rollers.

The vessel is preferably provided with beaters or stirrers to keep the body of material in motion, and additional feed wheels operating on the material by surface friction may also be provided so as to facilitate and ensure that the material passes to the measuring and feeding rollers.

As apparatus of this character is usually intended to be employed in depositing measured quantities of chocolate or like materials in or on moulds or plates as they pass beneath the extrusion orifice, it is frequently convenient that the vessel as a whole may be rocked or moved in the direction of movement of said moulds during the actual extrusion phase and be returned in the reverse direction during the cut off phase. The vessel may therefore be mounted on trunnions or the like and means may be provided for giving a rocking movement of suitable rate, amplitude and timing.

Inasmuch also as it is generally desirable that the apparatus may be used for depositing in a plurality of rows, the depositing chamber is divided by a number of parallel plates of suitable shape so as to constitute a number of separate chambers. The teeth of the measuring and feeding rollers are slotted for the passage of these plates and the latter extend upwards to the lower end of the oscillatory closure, said closure being provided with other dividing plates in continuation of the former plates, so that in effect the depositing chamber is transversely divided into a plurality of similar chambers, collectively but equally fed by the measuring and feeding rollers and collectively governed by the extrusion valve and relief valve.

In the accompanying drawings:—

Fig. 1 is a cross section of the apparatus according to the present invention.

Figure 2:
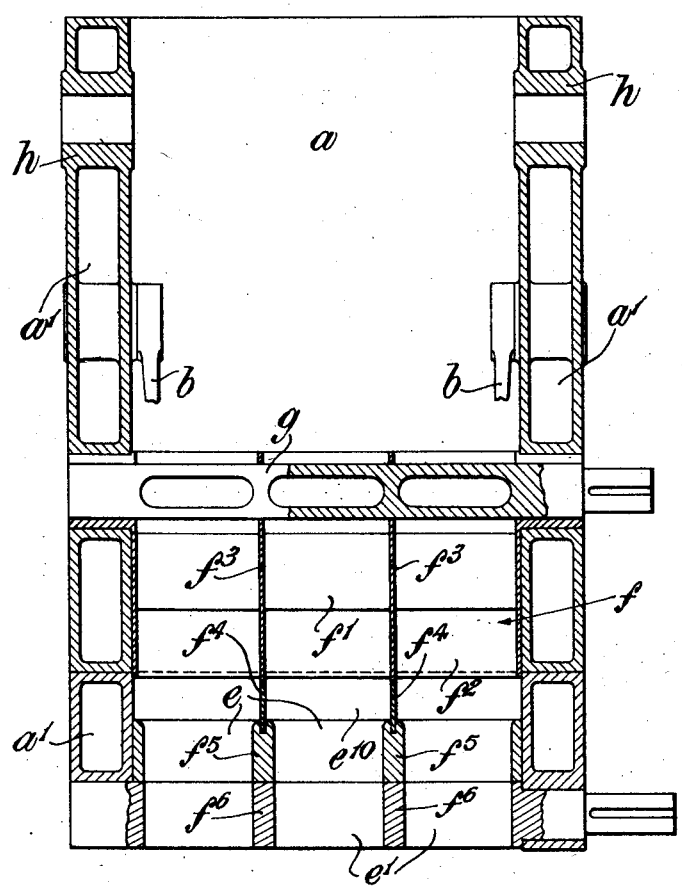

Fig. 2 a vertical section on line 2—2, Fig. 1.

As is usual in this class of apparatus for measuring and depositing plastic substances, there is provided for the reception of said substances, a vessel or hopper $a$, conveniently jacketed as at $a^1$ for tempering medium and provided with beaters or stirrers $b$ and additional feed wheels $b^1$ with, preferably, serrated peripheries. Within the vessel $a$ and at the base thereof are two measuring and feeding rollers $c$, $c^1$ provided on their peripheries with teeth $c^2$, the cavities between said teeth and the curved side surfaces of said vessel, with which the rollers contact, forming the measuring chamber.

Now according to the present invention the shafts $c^3$, $c^4$, of the rollers $c$, $c^1$ are placed at a distance apart sufficient for the interposition between the peripheries of said rollers of an oscillatory closure $f$ comprising a pivotally mounted member $f^1$, on either side of which is rigidly fixed a depending plate $f^2$ flanged at its lower end to engage the peripheries of the respective rollers $c$, $c^1$. The oscillatory closure $f$ is also provided at its upper end, preferably at its axis of rotation, with a relief valve $g$ which may be interconnected with an extrusion valve $e^1$ within a discharge opening $e$, as for example by arms $g^1$ $g^3$ and link $g^2$, in such a manner that when either valve is closed the other is open.

The space $e^{10}$ between the inner wall of the casing $a$ adjacent said discharge opening, the peripheries of the rollers $c$, $c^1$ and the oscillatory member $f$ constitute the depositing chamber.

It will be apparent that the measuring and feeding rollers $c$, $c^1$, can be continuously driven since, if the extrusion valve $e^1$ is closed, the plastic substance fed into the depositing chamber $e^{10}$ will pass back into the vessel $a$ through the relief valve $g$.

For the purpose of depositing in a plurality of rows, it is usual to provide transverse dividing plates $f^4$ at intervals along the length of the vessel $a$, said plates conveniently extending up to the hubs of the rollers. This oscillatory closure $f$ is also provided with dividing plates $f^3$ in the same vertical plane as the dividing plates of the vessel. It will be understood that the extrusion outlet $e$ and its valve $e^1$ may be similarly divided as at $f^5$, $f^6$, respectively, into a plurality of nozzles or other forms of delivery openings if desired.

Trunnion bearings $h$ may be provided in the upper part of the vessel $a$ about which said vessel is capable of rocking movement when for example depositing plastic substance into or on moulds, plates or the like.

I claim:—

1. Apparatus for measuring and depositing plastic substances comprising in combination a container for the substance to be fed having a discharge opening therein, peripherally-toothed measuring and feeding rollers rotatably disposed within said container and adapted to discharge a measured quantity of said substance through said discharge opening, a cut-off valve in said discharge opening, a pair of spaced depending plates forming a vibratory closure, a relief valve in the space between said plates, the axes of said rollers being placed at a distance apart sufficient for the interposition of said closure between their peripheries, said plates at their lower ends engaging the peripheries of the measuring and feeding rollers.

2. Apparatus for measuring and depositing plastic substances comprising in combination a container for the substance to be fed having a discharge opening therein, peripherally-toothed measuring and feeding rollers rotatably disposed within said container and adapted to discharge a measured quantity of said substance through said discharge opening, a cut-off valve in said discharge opening, a pair of spaced depending plates forming a vibratory closure pivoted at a point above its points of contact with the peripheries of said rollers, a relief valve in the space between said plates, the axes of said rollers being placed at a distance apart sufficient for the interposition of said closure between their peripheries, said plates at their lower ends engaging the peripheries of the measuring and feeding rollers and adapted to be oscillated by the teeth on the rollers during their rotation.

3. Apparatus for measuring and depositing plastic substances comprising in combination a container for the substance to be fed having a discharge opening therein, peripherally-toothed measuring and feeding rollers rotatably disposed within said container and adapted to discharge a measured quantity of said substance through said discharge opening, a cut-off valve in said discharge opening, a pair of spaced depending plates forming a vibratory closure pivoted at a point above its points of contact with the peripheries of said rollers, a relief valve in the space between said plates, means whereby the relief valve is so interconnected with the cut-off valve that when either valve is closed the other is opened, the axes of said rollers being placed at a distance apart sufficient for the interposition of said closure between their peripheries, said plates at their lower ends engaging the peripheries of the measuring and feeding rollers and adapted to be oscillated by the teeth on the rollers during their rotation.

4. Apparatus for measuring and depositing plastic substances comprising in combination a container for the substance to be fed having a discharge opening therein, transverse dividing plates within said container, peripherally-toothed measuring and feeding rollers rotatably disposed within said container and adapted to discharge a measured quantity of said substance through said discharge opening, a pair of spaced depending plates forming a vibratory closure pivoted at a point above its points of contact with the peripheries of said rollers, dividing plates within said closure in continuation of the dividing plates of the container, a relief valve in the space between said spaced depending plates, means whereby the relief valve is so interconnected with the cut-off valve that when either is closed the other is opened, the axes of said rollers being placed at a distance apart sufficient for the interposition of said closure between their peripheries, said plates at their lower ends engaging the peripheries of the measuring and feeding rollers and adapted to be oscillated by the teeth on the rollers during their rotation.

In witness whereof I have signed this specification.

GWENDOLINE DENNING BUNCE,
*Administratrix of the Estate of John Percival Bunce, Deceased.*